May 27, 1969     W. S. SUTOWSKI     3,446,536

WHEEL STRUCTURES

Filed Feb. 27, 1967     Sheet 1 of 2

INVENTOR.
WALTER S. SUTOWSKI

BY

ATTORNEYS.

May 27, 1969 W. S. SUTOWSKI 3,446,536
WHEEL STRUCTURES
Filed Feb. 27, 1967 Sheet 2 of 2

INVENTOR.
WALTER S. SUTOWSKI
BY
ATTORNEYS

United States Patent Office 3,446,536
Patented May 27, 1969

1

3,446,536
WHEEL STRUCTURES
Walter S. Sutowski, 6976 Crestview Drive,
Brecksville, Ohio 44141
Filed Feb. 27, 1967, Ser. No. 618,803
Int. Cl. B60b 37/00, 1/06; F16c 33/00
U.S. Cl. 301—1                 9 Claims

ABSTRACT OF THE DISCLOSURE

Vehicle wheel structures having axially spaced sets of ball bearings in raceways carried by a shaft and outer race member concentric therewith, disk members together forming the hub, web and rim of the wheel, the hub accommodating the shaft, outer race member, ball bearings, and reinforcing means, wherein the disk members, race member and reinforcing means revolve as a unit about the axle on the ball bearings, the hub closing the open spaces at opposite ends of the race member otherwise exposing the balls and in some embodiments covering an end of the shaft as well.

Background of the invention

This invention is in the field of metal wheels used on mowers, tractors and other vehicles. Most prior wheels of this general class have had the wheel formed of metal disks and thereafter bearing members were inserted into the hub of the wheel and there held by a press fit or other means. In those prior constructions, the bearings were exposed to a great degree on opposite sides of the wheel to dust, dirt and other foreign material.

In th present invention, the bearing member is constructed within the hub of the wheel during the fabrication of the wheel whereby the bearing member becomes an integral part of the wheel and cannot be removed without destruction of the wheel structure. The present construction is such that the bearing members are given the maximum protection and shielded from dirt, dust and other foreign material. The construction according to the present invention lends itself to rapid and economical fabrication of the wheel and also provides a wheel having superior characteristics and rugged construction.

Summary of the invention

This invention comprises a metal wheel having a bearing member mounted within the hub of the wheel by means of the unique construction hereinafter described and identified in the claims appended hereto.

An object of the invention is to provide an economical, improved and readily fabricated wheel for mowers, tractors and like vehicles.

Another object is the provision for securely mounting a bearing member within a wheel and for protecting the bearing member within the wheel.

Other objects and a fuller understanding of this invention may be had by referring to the following description and claims, taken in conjunction with the accompanying drawings, in which:

2

Figure 1:
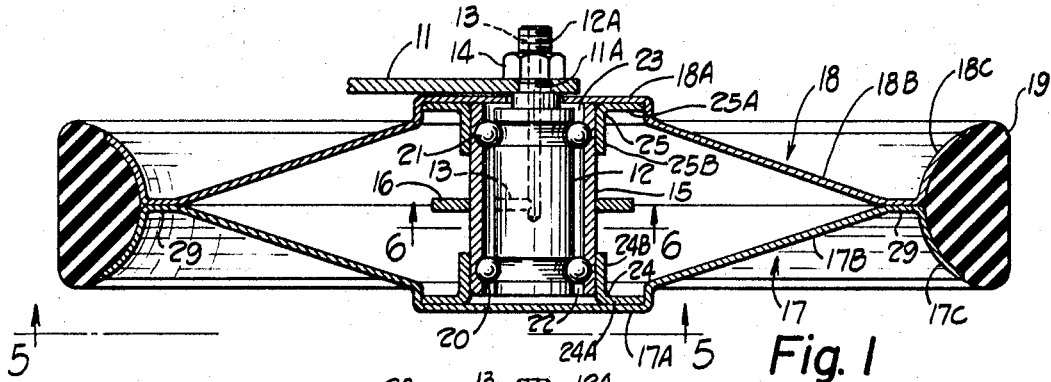
FIGURE 1 is a diametric section taken through a wheel embodying my invention.
Figure 2:
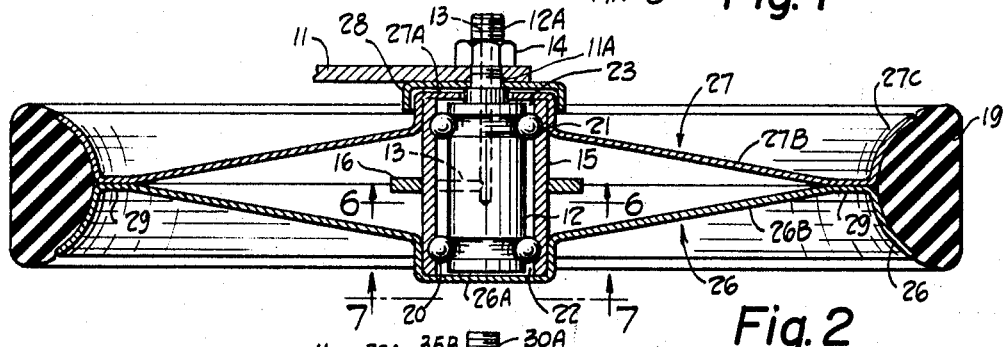
FIGURE 2 is another diametric section taken through a wheel having a modified form of that shown in FIGURE 1.
Figure 3:
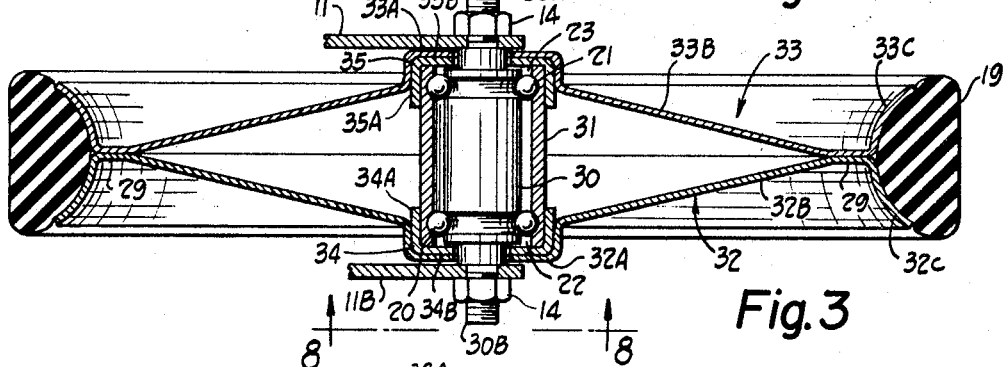
FIGURE 3 is another diametric section taken through a wheel embodying a still further modified form of my invention.
Figure 4:
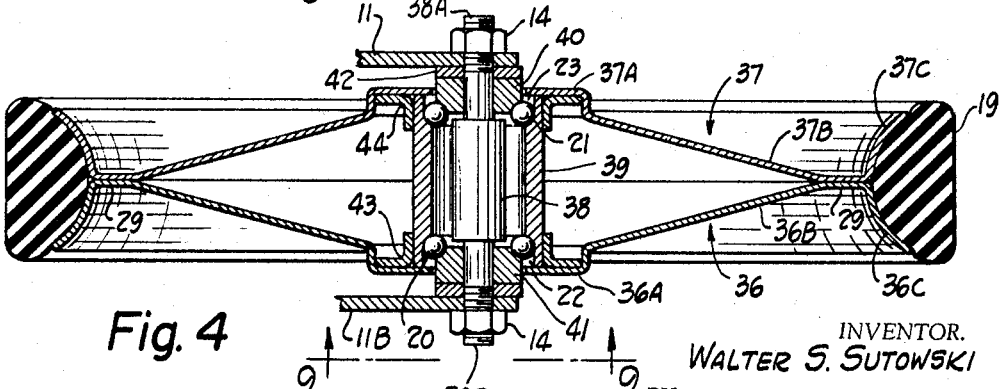
FIGURE 4 is a diametric section taken through a wheel embodying a still further modified form of my invention.
Figure 5:
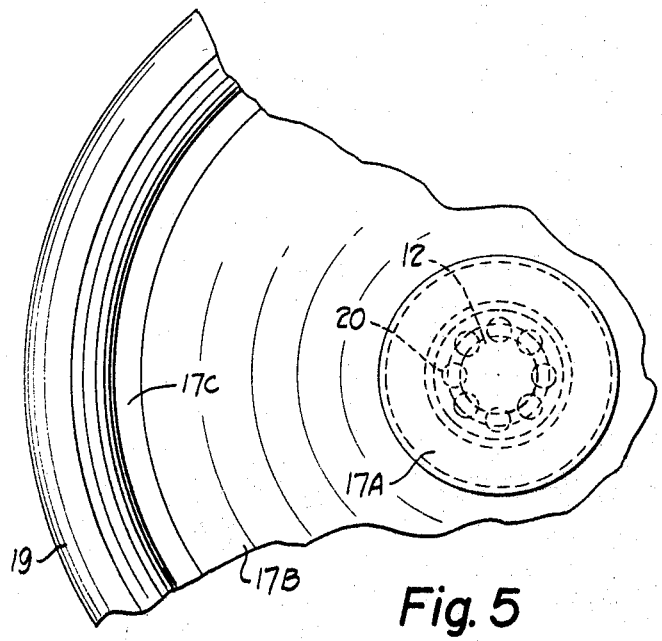
Figure 6:
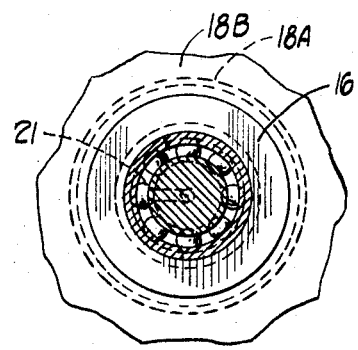
Figure 8:
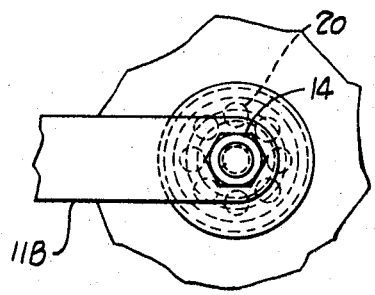
Figure 7:
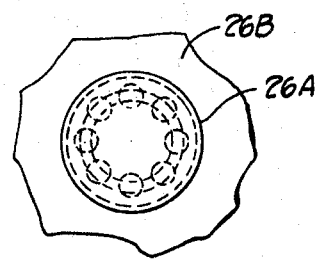
Figure 9:
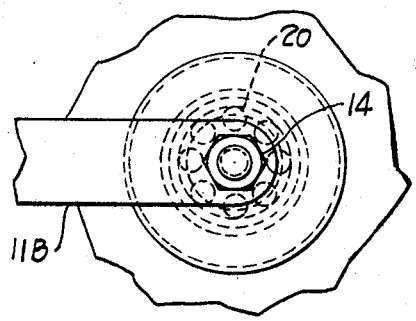

FIGURE 5 is an end view of the wheel shown in FIGURE 1 looking in the direction of the arrows 5—5 of FIGURE 1;

FIGURE 6 is a cross sectional view taken through the line 6—6 of FIGURE 1 and also through the line 6—6 of FIGURE 2;

FIGURE 7 is an end view looking in the direction of the arrows 7—7 of FIGURE 2;

FIGURE 8 is an end view looking in the direction of the arrows 8—8 of FIGURE 3; and FIGURE 9 is an end view looking in the direction of arrows 9—9 of FIGURE 4.

In the drawings, the reference character 11 indicates a vehicle part upon which a wheel embodying my invention is mounted. This vehicle part 11 may be a hanger, shell or body of a mower, tractor, or other vehicle. This vehicle part 11 has an opening 11A extending therethrough for accommodating the stud extending from the wheel. In some vehicles there are two parts, part 11 and part 11B and disposed in spaced and parallel relationship, these parts have aligned openings 11A through which studs are inserted and mounted.

In FIGURES 1 and 2 there is shown a shaft 12 disposed axially of the wheel. In FIGURES 1 and 2 the shaft 12 has a stud 12A extending from one axial end thereof, which stud 12A is threaded for threaded engagement with a nut 14. The stud 12A extends through an opening 11A in part 11 and the nut 14 threadably mounted on the stud 12A secures the shaft 12 firmly to the part 11.

For purposes of lubricating the bearing, lubrication openings 13 may extend axially of the shaft 12 and hence radially outward to supply grease or other lubricant to the internal bearing.

Mounted concentrically around the cylindrical shaft 12 is an outer race member 15. In the forms of the invention shown in FIGURES 1 and 2, the outer race member 15 is slit, that is, it has a longitudinal slit extending along one side, and the outer race member 15 tends to resiliently expand unless and until the slit is closed by outer confinement. For the purpose of holding the slit in outer race member 15 closed during the assembly and prior to its being held in place by the wheel body, an assembly washer 16 is utilized. This washer 16 holds the race member 15 closed but after the race member 15 is secured in the position shown in FIGURES 1 and 2, then the washer 16 is no longer required, but remains in position.

The wheel proper is made up of two metal disk members 17 and 18. These disk members are preferably of a suitable strong steel which accommodates itself to a stamping operation for forming the same. Disk member 17 shown in FIGURE 1 has a hub portion 17A, a web portion 17B and a rim portion 17C. The opposing disk member 18 likewise has a hub portion 18A, a web portion 18B and a rim portion 18C. The web portions and the rim portions of these disk members are similar as seen in the drawing but the hub portions vary somewhat in that hub portion 17A has a closed end wall and hub portion 18A has a small opening therethrough for accommodating the end of the shaft 12 extending therethrough. The fit of the shaft 12 in the opening in hub portion 18A is quite close so as to prevent dirt, dust or other foreign material from entering the wheel and around the bearing.

A rubber tire 19, usually a solid rubber tire is mounted in the rim provided by rim portions 17C and 18C. As seen in the drawings, the shaft member 12 is provided with two spaced sets of grooves which provide an inner raceway and the race member 15 is provided with two corresponding spaced grooves in the inner wall thereof to form the outer raceways. In the two sets of opposed raceways there are provided sets of ball bearings 20 and 21 extending in circles around the axis of the shaft 12.

Between the outer race member and the shaft 12 at one end there is an annular space 22 and at the other end between the race member 15 and the shaft 12 there is another annular open space 23. Unless covered this annular space would permit dirt, dust and other foreign material to enter into the bearing unit within the wheel and to interfere with the efficient operation of the bearing.

It is noted that the hub portions of the disks have opposite end walls disposed normal to the axis of the wheel, about which end walls and extending toward each other are cylindrical walls whereby each hub portion is cup shaped in form. Disposed in the hub portion 17A and around one end of the race member 15 is an angular reinforcing member 24. Within the hub portion 18A and around the other end of the race member 15 is another angular reinforcing member 25. These are disposed as shown in the drawing and rigidly held in place so as to provide strength and rigidity to the wheel and to firmly hold the race member 15 in proper position.

In assembly, the bearing unit made up of shaft member 12, balls 20 and 21, and outer race member 15, are first put together in the usual manner to provide a bearing unit. The washer member 16 is disposed around the race member 15 to hold it in closed or compressed condition. This assembled unit is then placed so that the lower end of the race member 15 is disposed within the bore provided by cylindrical portion 24A of reinforcing member 24 and the bearing unit, including the reinforcing member 24 is then positioned down within the hub portion 17A to the position shown in FIGURE 1 and the flange portion 24B of the reinforcing member 24 is welded or otherwise firmly secured to the hub portion 17A in the position shown. Thereafter the other disk member 18 has the reinforcing member 24 secured thereto by welding or otherwise suitably securing the flange portion 25A of the reinforcing member 25 to the hub portion 18A. The disk member 18 is then moved downwardly so as to dispose the cylindrical portion 25B of the reinforcing member 25 around the upper end of, and embracing, the race member 15. With the two disk members thus superimposed upon each other, with the bearing unit mounted in the opposed hub portions thereof, the disk members 17 and 18 are securely joined together by welding, at locations 29, the portions thereof together. The welding may be continuously around the circumferential extent or may be at selected spots around the extent of the wheel. The two disk members are thus integrally joined together to form a rigid and storing wheel with the bearing unit securely mounted within and protected by the hub portion of the wheel. The rubber tire 19 may be thereafter mounted to the rim on the wheel. The assembled wheel is then readily mountable on a vehicle part 11.

In the modification of FIGURE 2, the angular reinforcing members 24 and 25 are eliminated. In this later modification, the disk members are modified so that the hub portions have a smaller diameter whereby the end portions of the race member 15 are closely confined and embraced directly by the cylindrical walls of the hub portions. In the form of FIGURE 2, there is one disk member 26 having a hub portion 26A, a web portion 26B and a rim portion 26C. The other and opposing disk member 27 has a hub portion 27A, a web portion 27B and a rim portion 27C. The web portion 26B and 27B are also securely held together by welding at 29 at locations around the wheel. It is noted that the cylindrical wall of the hub portions 26A and 27A are in direct engagement and in a press fit with the end portions of the race member 15 whereby the race member 15 is firmly secured within and held by the hub portions, whereby the race member 15 and the wheel made up of disks 26 and 27 revolve together. The assembly of the parts is similar to that described in FIGURE 1 except for the omission of the re-inforcing members. In the form shown in FIGURE 2, there is also an auxiliary dust guard 28 surrounding the stud 12A between the part 11 and the wheel at the hub portion 27A.

In the somewhat modified form shown in FIGURE 3 the shaft is modified from that illustrated in FIGURES 1 and 2 in that it has studs extending from its opposite axial ends. This shaft in FIGURE 3 is denoted by the reference character 30. It has a stud 30A extending from one axial end and another stud 30B extending from the opposite axial end. These studs extend through openings in the vehicle parts 11A and 11B and they are held in position by nuts 14 threadably engaged on the studs 30A and 30B. The outer race member on the shaft 30 is denoted by the reference character 31 and in this instance the outer race member 31 is not slit. The reinforcing members in FIGURE 3 are also modified from that shown in FIGURE 1 in that the flange portions thereof extend radially inward rather than outward. Reinforcing member 34 has a flange portion 34B which is disposed between the end wall of hub portion 32A and the lower end of race member 31. The cylindrical portion 34A of reinforcing member 34 tightly engages and embraces the lower end portion of race member 31. Similarly, reinforcing member 35 has a flange portion 35B disposed between the upper end of the race member 31 and the end wall of hub portion 33A. The cylindrical portion 35A of the reinforcing member 35 is disposed between the cylindrical wall of the hub portion 33A and the outer wall of the race member 31. There is a press fit between the race member 31 and reinforcing members 34 and 35 and also a press fit between the reinforcing members 34 and 35 and the respective hub portions 32A and 33A whereby the race member 31 revolves with the wheel made up of disk members 32 and 33. If desired for further strengthening, the reinforcing member 34 may be welded to the hub portion 32A and the reinforcing member 35 may be welded to the hub portion 33A prior to the positioning of the bearing unit made up of shaft 30, balls 20 and 21, and race member 31. This bearing unit may then be placed in the nest or bore formed by reinforcing member 34 and when the disk member 33 is positioned over the disk member 32 the upper end of race member 31 may be disposed within the bore or nest in the reinforcing member 35. To accommodate for the different dimensions of the bearing unit including the reinforcing members 34 and 35, the disk members are somewhat different in dimensions and in this instance the disk member 32 is provided with hub portion 32A, web portion 32B and rim portion 32C. The opposed other disk member 33 is provided with hub portion 33A, web portion 33B and rim portion 33C. The end walls of the hub portions 32A and 33A are closed except for aligned openings to accommodate the opposite ends of the shaft 30 extending therethrough. These openings permit only a slight clearance between the shaft and the respective hub portions.

A still further modification is illustrated in FIGURE 4. In this form of the invention there is a shaft 38 having oppositely directed stud portions 38A and 38B which are mounted in vehicle parts 11 and 11B by studs 38A and 38B. In this form the shaft 38 does not have raceways formed directly thereon, rather there are separable inner race members 40 and 41 mounted thereon so as to rotate with the shaft 38. The outer race member 39 has raceways disposed to oppose the raceways provided by the race members 40 and 41. It is to be noted that the raceways as shown in the drawings are disposed to receive both axial and radial thrust. Washers or gaskets 42 are disposed between the race member 40 and vehicle part 11 at one end and race member 41 and vehicle part 11B at the other end. In the form of FIGURE 4, reinforcing members 43 and 44 are utilized at the opposite ends of the race member 39. These race members 43 and 44 are somewhat similar to race members 24 and 25 of FIGURE 1 in that the flange portions extend radially outward from the cylindrical portions which embrace and tightly engage the race member 39 at its opposite ends. To accommodate the form of bearing unit embodied in the wheel in FIGURE 4, the disk members are somewhat different in dimensions and therefore in this form there is a disk member 36 and a disk member 37 disposed opposite to each other and joined at locations 29 as shown. Disk member 36 has a hub portion 36A, a web portion 36B and a rim portion 36C. Similarly, disk member 37 has a hub portion 37A, a web portion 37B and a rim portion 37C. The end walls of the hub portions 36A and 37B are closed except for openings which accommodate the inner and outer race members 40 and 41 respectively mounted on the shaft 38. It is noted that in all cases the annular open spaces 22 and 23 at the opposite ends of the outer race members and which otherwise expose the balls 21 and 22 are closed by the end walls of the respective hub portions so as to minimize the entrance of dirt, dust and other foreign material.

By the unique construction shown and illustrated, a strong, serviceable wheel is provided by means of integrally mounting the bearing unit within the hub of the wheel made up of opposed metal stampings, which stampings form the hub, web and rim of the wheel. The bearing units are firmly held in position and are well protected from material which would otherwise tend to enter into the bearing and cause inefficiencies and deterioration of the ball bearings in their respective raceways.

The present disclosure includes that contained in the appended claims as well as that in the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A vehicle wheel adapted to be mounted to a vehicle part having stud receiving means therethrough, said wheel comprising in combination an axle shaft, stud means extending axially from said axle shaft and adapted to be mounted in said stud receiving means and secured to said vehicle part, a pair of inner ball raceways carried by said axle shaft and spaced axially from each other, a cylindrical outer race member disposed concentrically about said axle shaft having a pair of outer ball raceways carried by the outer race members and spaced axially from each other to oppose the said inner raceways, respectively, a plurality of ball bearings arranged in sets respectively disposed in each opposed pair of raceways to provide bearing support for said outer race member, said inner raceways each being integrally formed with a radially extending wall secured to said axle shaft and directed axially toward the radially extending wall of the other inner raceway to limit axial movement of the said sets of ball bearings away from each other in response to axial thrust imposed on the said sets of ball bearings by said outer raceways, a pair of annular metal disk members axially aligned and facing each other to form together a wheel body, each said disk member having a web portion, a rim portion disposed radially outwardly of the web portion, and a hub portion disposed radially inward of the web portion, said web portions being secured together to hold said disk members together, the rim portions together forming a tire-accommodating annular groove, the hub portions being axially spaced and forming together a hub shell having axially spaced end walls and annular outer walls, said hub shell enclosing and being secured to said outer race member to revolve therewith, said end walls of the hub shell extending radially inward at the opposite axial ends of said outer race member, and a pair of annular reinforcing members disposed within said hub shell at opposite axial ends thereof, respectively, each said reinforcing member having an annular axially-extending portion extending along and embracing said outer race member adjacent an axial end thereof and an annular radially extending portion integral with, and disposed at a substantially right angle to, said axially extending portion adjacent the said end walls, respectively, of said hub shell.

2. A wheel as claimed in claim 1 and in which the end wall of said hub shell on one axial end thereof is closed to cover said outer race member, balls and axle shaft at said one axial end.

3. A wheel as claimed in claim 1 and in which said annular radially extending portions of each said reinforcing member extend radially outwardly from said axially extending portion thereof and are secured to the adjacent end walls, respectively, of the said hub shell.

4. A wheel as claimed in claim 1 and in which said annular radially extending portions of each said reinforcing member extends radially inward from said axially extending portion thereof and embrace therebetween said outer race member.

5. A vehicle wheel adapted to be mounted to a vehicle part having stud receiving means carried thereby, said wheel comprising in combination an axle shaft, stud means extending axially from said axle shaft and adapted to be mounted in said stud receiving means and secured to said vehicle part, said shaft carrying a pair of axially spaced inner raceways, a cylindrical outer race member disposed outwardly of, and concentrically of, said shaft, said race member carrying a pair of axially spaced outer raceways disposed opposite the respective inner raceways carried by said shaft, a pair of sets of ball bearings disposed in the opposed inner and outer raceways to provide ball bearing engagement between said shaft and race member at the axially spaced locations fixed by said raceways, said inner raceways each being integrally formed with a radially extending wall secured to said axle shaft and directed axially toward the radially extending wall of the other inner raceway to limit axial movement of the said sets of ball bearings away from each other in response to axial thrust imposed on the said sets of ball bearings by said outer raceways, said outer race member being so spaced from said shaft at the opposite axial ends of the outer race member as to leave annular open spaces exposing said sets of balls adjacent the said opposite ends of the outer race member, a pair of metal disk members formed to provide together a hub shell, web portions extending radially outward from said hub shell and converging to a location radially spaced outwardly from said hub shell and joined together adjacent said location, and rim portions extending radially outward from said location and diverging outwardly to provide a tire-accommodating rim, said hub shell having axially spaced end walls and annular outer walls, said end walls being disposed to embrace said outer race member therebetween and to substantially close said annular spaces and block exposure of said sets of balls through said open spaces, respectively, said hub shell and outer race member being operatively connected to revolve as a unit about said shaft, and a pair of annular reinforcing members secured to said disk members, respectively, and disposed within said hub shell at opposite axial ends thereof, each said reinforcing member having a cylindrical portion disposed adjacent and embracing said outer race member and a flange portion extending radially from said cylindrical portion disposed adjacent a said end wall, said reinforcing members being embraced between said end walls.

6. A wheel as defined in claim 5 and in which at least one end wall of the hub shell is closed between said annular walls to extend across the respective end of said shaft in blocking the said annular space at said end.

7. A wheel as claimed in claim 5 and in which said flange portion of each of the reinforcing members extend radially outwardly from said cylindrical portion and are secured to the adjacent end walls, respectively, of said hub shell.

8. A wheel as claimed in claim 5 and in which said flange portion of each of the reinforcing members extend radially inwardly from said cylindrical portion and embrace therebetween said outer race member.

9. A vehicle wheel adapted to be mounted to a vehicle part having a stud receiving means carried thereby, said wheel comprising in combination an axle shaft having first and second axial ends, stud means extending from said first axial end of said axle shaft and adapted to be mounted in said stud receiving means and secured to said vehicle part, said shaft integrally formed therewith a pair of axially spaced inner raceways each provided with radially extending opposed side walls for retaining balls therein against movement in both axial directions, a cylindrical outer race member having integrally formed therewith a pair of axially spaced outer raceways each having opposed side walls for retaining balls therein against movement in both axial directions, said outer raceways opposing said inner raceways, respectively, a pair of sets of ball bearings disposed in the opposed inner and outer raceways to provide ball bearing engagement between said shaft and race member at the axially spaced locations fixed by the raceways, said outer race member being so spaced from said shaft at the opposite ends of the outer race member as to leave annular open spaces exposing said sets of balls adjacent the said opposite ends of the outer race member, a pair of metal disk members formed to provide together a hub shell, web portions extending radially outward from said hub shell and converging to a location radially spaced outwardly from said hub shell and joined together adjacent said location, and rim portions extending radially outward from said location and diverging outwardly to provide a tire-accommodating rim, said hub shell having axially spaced end walls and annular outer walls, one of said end walls being disposed to close the space between the outer annular wall at said second axial end of the axle shaft to cover the said second axial end of the shaft, the adjacent end of the outer race member and the annular space between the outer race member and shaft, the other of said end walls overlying a portion of the first axial end of the axle shaft to a location outwardly of said stud means to clear the same, said other of the end walls covering the adjacent end of the outer race member and the annular space between the outer race member and shaft, and a dust guard embracing said stud means and positioned between said vehicle part and the said other of the end walls clearing the stud means to inhibit movement of dust entering the hub shell along said stud means.

References Cited

UNITED STATES PATENTS

| | | |
|---|---|---|
| 2,427,430 | 9/1947 | Waldeck. |
| 2,496,615 | 2/1950 | Ayers. |
| 2,624,104 | 1/1953 | Finstead _____ 301—5.7 X |
| 2,866,672 | 12/1958 | Black. |
| 2,955,884 | 10/1960 | Marshall _____ 308—190 |
| 3,290,101 | 12/1966 | Recknagel _____ 308—187.1 X |

FOREIGN PATENTS 805,970   6/1951   Germany.

RICHARD J. JOHNSON, *Primary Examiner.*

U.S. Cl. X.R.

301—63; 308—191